United States Patent
Francke et al.

(10) Patent No.: US 6,614,180 B1
(45) Date of Patent: Sep. 2, 2003

(54) RADIATION DETECTION APPARATUS AND METHOD

(75) Inventors: Tom Francke, Sollentuna (SE); Vladimir Peskov, Stockholm (SE)

(73) Assignee: XCounter AB, Danderyd (SE)

( * ) Notice: Subject to any disclaimer, the term of this patent is extended or adjusted under 35 U.S.C. 154(b) by 325 days.

(21) Appl. No.: 09/698,173

(22) Filed: Oct. 30, 2000

(30) Foreign Application Priority Data

Jun. 5, 2000 (SE) ............................................. 0002079

(51) Int. Cl.[7] .................................................. H01J 1/34
(52) U.S. Cl. ..................... 313/527; 313/528; 250/361 R
(58) Field of Search ............................ 313/527, 103 R, 313/104, 528; 250/361 R, 368, 213 VT, 374, 397

(56) References Cited

U.S. PATENT DOCUMENTS

| | | | |
|---|---|---|---|
| 4,454,422 A | 6/1984 | Persyk | 250/363 S |
| 4,733,085 A * | 3/1988 | Anderson | 250/374 |
| 4,937,455 A | 6/1990 | Kurz | 250/385.1 |
| 5,144,141 A | 9/1992 | Rougeot et al. | 250/369 |
| 5,164,809 A * | 11/1992 | Street et al. | 257/55 |
| 5,192,861 A * | 3/1993 | Breskin et al. | 250/214 VT |
| 5,223,717 A | 6/1993 | Charpak | 250/374 |
| 5,430,299 A | 7/1995 | Bateman et al. | 250/374 |
| 5,656,807 A * | 8/1997 | Packard | 250/214 VT |
| 5,665,971 A * | 9/1997 | Chen et al. | 250/385.1 |

FOREIGN PATENT DOCUMENTS

EP 0 450 571 A2 10/1991

* cited by examiner

Primary Examiner—David V. Bruce
Assistant Examiner—Jurie Yun
(74) Attorney, Agent, or Firm—Birch, Stewart, Kolasch & Birch, LLP

(57) ABSTRACT

An apparatus and method for detecting ionizing radiation are presented. The apparatus includes a scintillator adapted to convert incident ionizing radiation into light; a photocathode adapted to release photoelectrons in dependence on the light; an electron avalanche amplifier adapted to avalanche amplify the photoelectrons; and a readout arrangement adapted to detect the avalanche amplified electrons. The electron avalanche amplifier in one implementation is a gaseous avalanche amplifier including an array of amplification regions. A protective layer is provided to prevent the avalanche gas from coming into contact with the photocathode.

37 Claims, 3 Drawing Sheets

RADIATION DETECTION APPARATUS AND METHOD

BACKGROUND OF THE INVENTION

1. Field of the Invention

The present invention generally relates to an apparatus and method for detection of ionizing radiation, particularly but not exclusively X-rays.

The invention is usable in a variety of fields including e.g. medical radiology, computerized tomography (CT), microscopy, and non-destructive testing.

2. Background Information

Scintillator based detection systems are widely used for high-resolution imaging of gamma and x-rays. Such imaging systems use the detected radiation to produce a signal, which can be used to operate a visual display, such as a cathode ray tube.

One example of such an imaging system is the Anger camera, which is commonly used in medical diagnostic procedures. In the Anger camera, incident radiation passes through a collimator before striking a scintillator layer. Light generated by the interaction of the incident radiation and the scintillator material then spreads out through an underlying light guide until it strikes an array of photomultipliers. The intensity of the light striking the individual photomultipliers varies dependent on the distance of the photomultiplier from the point where the incident radiation interacted with the scintillator to produce the initial light burst. A resistor network electrically determines the point of the radiation impact on the array based upon the magnitude of the respective electrical output of the photomultiplier devices in the array; summing the electrical output signals provides a measure of the energy level of the initial incident radiation. The low efficiency of the light guide and the poor photo-emission conversion of the photomultipliers result in significant statistical fluctuation of collected light photons, which causes degraded spatial and energy level resolution. Additionally, Anger cameras have relatively low count rates as every incident gamma ray that interacts with the scintillator material results in substantially the entire array being rendered non responsive until the light generated from the earlier interaction has diminished.

Another common prior art device is known as an image intensifier gamma camera. In such devices, the scintillator is shaped to be tightly coupled to the transparent window of a large field of view image intensifier tube, which discharges photoelectron energy packets in response to the light signal from the scintillator. The photoelectron packets are accelerated and focused onto a cathodoluminescent phosphor deposited on a fiber optic output plate, generating additional light photon bursts. Multiple image intensifier stages can be coupled together to further amplify the signal. The final burst of photoelectrons will generate charges on a resistive charge divider from which the center of gravity of the pulse is reconstructed. Image intensifier cameras have substantial weight, size and expense, which inhibit their practical use for many applications.

A solid-state radiation detector is disclosed in U.S. Pat. No. 5,144,141. In this detector, radiation incident on the detector passes through a collimator and strikes a scintillator, which is divided into a plurality of scintillator elements arranged in rows and columns. An array of internal gain photodetectors divided into rows and columns are optically connected to the scintillator elements. Each photodetector is electrically coupled to a respective detect and hold circuit which amplifies and stores the pulse generated by the photodetector; the stored pulses are sampled via a multiplexed switching arrangement to allow the stored signal from each detect and hold circuit to be processed to produce a digitized imaging signal, which corresponds to the energy level of, and location on the array of, the detected incident radiation. The digitized imaging signal is supplied to display memory and analysis equipment for the device.

Particularly for radiation imagers employed in medical procedures, in which it is desired to expose the patient to the minimum amount of ionizing radiation as possible, it is important that the imaging device be sensitive to low levels of radiation while still being able to discriminate against background radiation. Solid-state detectors have a somewhat limited amplification due to losses, and thus in some application they do not possess sufficiently high signal-to-noise ratios.

Improved spatial resolution requires the use of a large number of photodetectors and a scintillator system, which generates light photons only in the scintillator segment in which the incident radiation was absorbed. The use of a larger number of photodetectors in a large array or to increase the resolution of the device rapidly results in very complex and expensive apparatus.

Further, photodetectors are sensitive to direct irradiation by the incident X-rays and hence measures have to be taken in order to prevent the incident radiation from reaching the photodetectors.

Additionally, solid-state radiation detectors have a limited speed. They normally require long integration times in the electronics, several microseconds, in order to capture a large fraction of the signal and keep down the noise level. This prevents them in most applications to be used for single photon detection. Additionally the noise level in solid state detectors is normally too high to be able to detect single photons.

SUMMARY OF THE INVENTION

Accordingly, the present invention to provide an apparatus and method for detection of ionizing radiation, particularly X-rays, which provide for an effective amplification and having high signal-to-noise ratios.

The invention provides such detection apparatus and method, which provide for high sensitivity, and can thus operate at very low X-ray fluxes.

The present invention provides such detection apparatus and method, having detection elements, which are insensitive to direct irradiation by the ionizing radiation.

The present invention provides a detection apparatus and method, which are capable of detecting and resolving single light photons emitted from a scintillator by a single X-ray. This allows a more accurate determination of the X-ray energy than conventional integrating techniques.

The present invention provides such detection apparatus and method, which are effective, fast, accurate, reliable, and of low cost.

The present invention, is attained by apparatus and methods as claimed in the appended claims.

By employing avalanche amplification of electrons released from the photocathode of the detection apparatus a particularly sensitive apparatus and method are achieved, which provide for the employment of extremely low doses of radiation, still obtaining signal levels high enough for construction of two-dimensional images exhibiting very low noise levels.

The inventive detector is not very sensitive to magnetic fields.

Yet a further advantage of the invention is that it provides for the manufacture and use of sensitive large-area detectors to a low cost.

Further characteristics of the invention and advantages thereof will be evident from the following detailed description of preferred embodiments of the invention, which are shown in the accompanying drawings.

BRIEF DESCRIPTION OF THE DRAWINGS

The present invention will become more fully understood from the detailed description of embodiments of the present invention given hereinbelow and the accompanying FIGS. 1–2, which are given by way of illustration only, and thus are not limitative of the invention.

DETAILED DESCRIPTION OF PREFERRED EMBODIMENTS

In the following description, for purposes of explanation and not limitation, specific details are set forth, such as particular dimensions and materials in order to provide a thorough understanding of the present invention. However, it will be apparent to one skilled in the art that the present invention may be practiced in other embodiments that depart from these specific details. In other instances, detailed descriptions of well-known apparatus and processes are omitted so as not to obscure the description of the present invention with unnecessary details.

Figure 1:
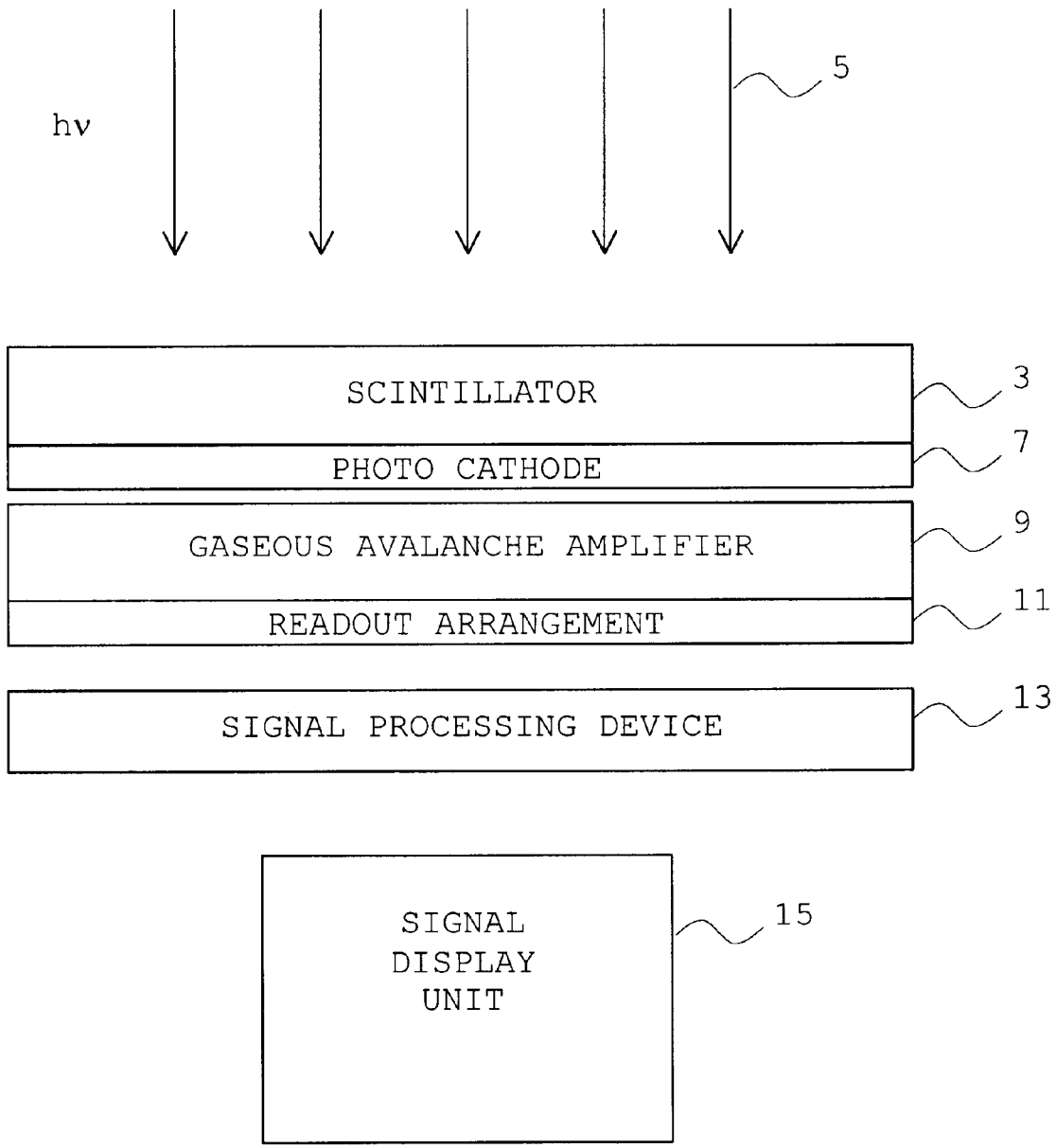
FIG. 1 illustrates schematically the main components of a detector apparatus according to the present invention.

With reference to FIG. 1, which schematically illustrates the main components of an inventive detector apparatus 1, the general principles of the present invention will be depicted.

The detector apparatus comprises a scintillator device 3, the front surface of which being directed towards the ionizing radiation 5 to be measured. The radiation is converted into light within scintillator device 3 through various physical interactions, which will be described closer below. The scintillator is a solid converter or it may comprise a liquid scintillating substance, e.g. liquid xenon or argon, or a solid scintillating substance.

The radiation is preferably X-rays, but the invention is useful with any kind of ionizing radiation that a scintillator device is capable of converting into light.

Further, a photocathode 7 is arranged at the back surface of scintillator 3, which is arranged such that it releases photoelectrons in dependence on the light photons that hit it. The cathode shall be thin such that it is capable of releasing electrons from the surface opposite to the surface onto which the photons are impinging.

An electron avalanche amplification apparatus 9 is arranged next to photocathode 7. Avalanche amplification apparatus 9 is preferably provided with two electrodes; an avalanche cathode and an avalanche anode (not indicated in FIG. 1), and is adapted to collect photoelectrons released from photocathode 7 and to strongly avalanche amplify these. Geometries and amplification material of electron avalanche amplification apparatus 9 and electric potentials, at which the avalanche electrodes are held, are selected such that a suitable amplification is obtained.

Preferably, electron avalanche amplification apparatus 9 comprises a closed chamber between the electrodes containing a gas suitable for electron avalanche amplification. Such suitable amplification media include for instance xenon, or mixtures of xenon and argon. Alternatively, liquid or solid electron amplification substances are used.

Further, detector apparatus 1 comprises a read-out arrangement 11, preferably located in the vicinity of the avalanche anode, the arrangement being adapted to detect pulses induced by the avalanche electrons and/or correspondingly produced ions. Readout arrangement 11 is connected a signal processing device 13 for necessary and/or desired post-processing of collected signal data. A signal display unit 15 is finally provided for displaying the processed signal data.

By using the principles of the present invention, i.e. by converting the light from the scintillator into electrons and by avalanche amplifying these in a suitable substance before detection, instead of using a conventional scintillator detector, a fast and sensitive detector is obtained to a low cost. The amplification is more effective than with conventional solid-state based detectors.

Next, with reference to FIG. 2, which schematically, and in a sectional view, illustrates an inventive detector apparatus 21, a particular embodiment of the present invention will be discussed in more detail.

The apparatus 21 includes a plurality of scintillator elements 23 arranged in an array 25 and exposed to incident radiation 27. Each scintillator element is optically coupled to a photocathode arrangement 29 including a photocathode layer 31 and an optional protective layer 33. An electron avalanche amplification detector 35 is arranged adjacent to photocathode arrangement 29, the detector including an array 36 of readout elements 37, each of which is electrically coupled to a signal processing circuit 39 by means of a respective signal conduit 40. The signal processing circuit 39 may further be connected to a signal display indicator (not shown in FIG. 2).

Incident radiation 27 typically comprises x-rays. The structure of the detector apparatus of the invention is, however, adaptable to the detection of other types of radiation provided that appropriate scintillator material and radiation absorbent material in any interstitial barriers are selected. For ease of description, incident radiation is referred to herein as rays, although, dependent upon the type of radiation to be detected, particles or other nomenclature known in the art may similarly be used to describe the radiation. Radiation is used to refer to the electromagnetic energy the imaging device is to detect (e.g. x-rays), and the words light or optical are used to refer to the light energy or photons that are produced by the scintillator material when it interacts with the incident radiation. In typical imaging devices, the energy level of the incident radiation ranges between about 10 keV and 500 keV. In this energy range, typical interactions between the incident radiation and the scintillator material include photoelectric absorption and Compton scattering. Both of these processes result in electrons being emitted from atoms in the scintillator that are struck by the incident ray, and as these electrons pass through the scintillator material their energy is converted to visible radiant light energy.

A collimator 41 is optionally disposed adjacent to scintillator array 25 so that the collimator overlies the scintillator array. Collimator 41 is positioned on detector apparatus 21 so that radiation incident on the device must pass through collimator passages 43 to enter scintillator elements 23. For ease of illustration, only a limited number of passages 43 are shown in FIG. 1; it should be noted, however, that collimator 41 would typically have a large number of such passages, which would be in coincidence with the underlying scintillator elements. The collimator preferably is comprised of lead, or any other high atomic number element.

The scintillator elements 23 forming array 25 typically form an MxN matrix, but can alternatively be in any shape appropriate for the employment of a particular apparatus. The scintillator elements typically have a parallelepiped shape, and may, by way of example and not limitation, have cross-sectional dimensions of 0.01–10 mm×0.01–10 mm and a depth of 0.1–100 mm. The scintillator array can be formed by cutting, or dicing, the elements from one block of scintillator material or alternatively the elements can be individually "grown" as needles or rods e.g. by evaporation or other known techniques such as sputtering or chemical vapor deposition. In a large area array, such as would be used for medical imaging purposes, an array may typically have many thousands of scintillator elements and have outer dimensions of up to 50 cm×50 cm. A small area array used for some applications may be smaller than 1 mm×1 mm. Scintillator elements 23 preferably are formed of a material having a relatively high efficiency for converting the incident radiation to optical energy, a relatively fast decay constant, and good optical transparency. Cesium iodide has proven to be a good scintillator material for the detection of x-rays, having a high conversion efficiency, a decay constant of 1 microsecond, and a refractive index of 1.8. Alternatively, other known scintillator materials, such as for instance NaI, $BaF_2$ or polymeric materials, may be used in the device of the present invention.

In accordance with the present invention, interstitial barriers 45 may optionally be disposed between the scintillator elements 23 so as to separate each scintillator element from adjoining elements. Interstitial barriers 45 comprise a material that effectively absorbs incident and secondary radiation rays, thereby substantially preventing light from passing between scintillator elements. Such a light absorptive barrier is particularly important in large area devices to ensure good spatial resolution, i.e. determination of the location on the array where the incident radiation ray strikes.

Figure 2:
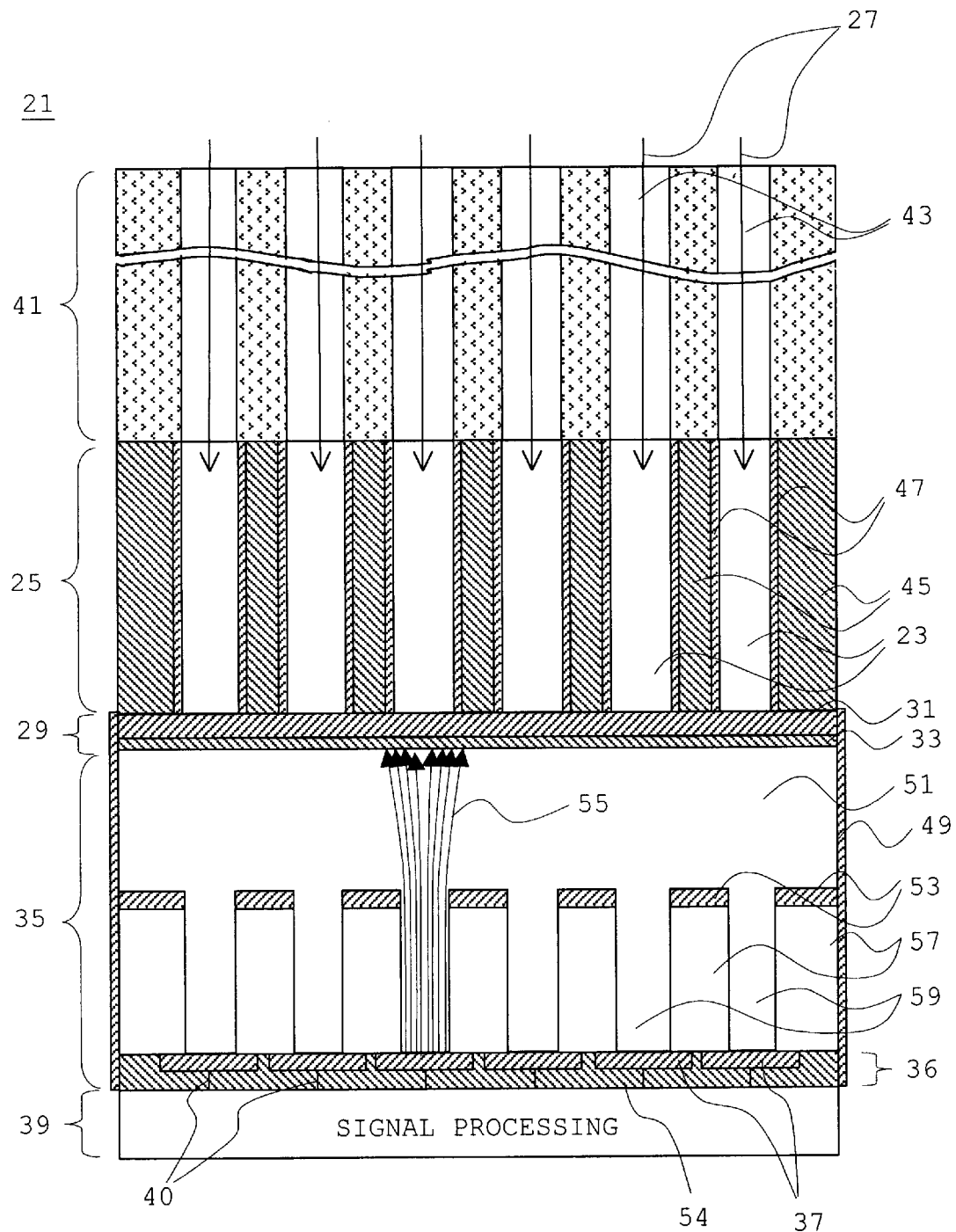
FIG. 2 illustrates schematically, in a cross sectional view, a particular embodiment of the detector apparatus according to the invention.

Optically reflective layers 47 may optionally be disposed between the adjoining surfaces of interstitial barriers 45 and the scintillator elements 23, and possibly across the portion of scintillator array 25 through which the incident radiation enters (not shown in FIG. 2). Optically reflective layers 47 serve to isolate the scintillator elements from one another by confining within one scintillator element the visible light generated by the absorption of incident radiation in the element. Reflective layers 47 comprise relatively thin, i.e., a about 0.01 $\mu$m to 0.5 $\mu$m layers of silver, aluminum, or similar material that is optically reflective and radiation transmissive, i.e. does not substantially interact with the incident radiation. Reflective layers can be, but need not necessarily be, deposited on all scintillator element surfaces.

Figure 2A:
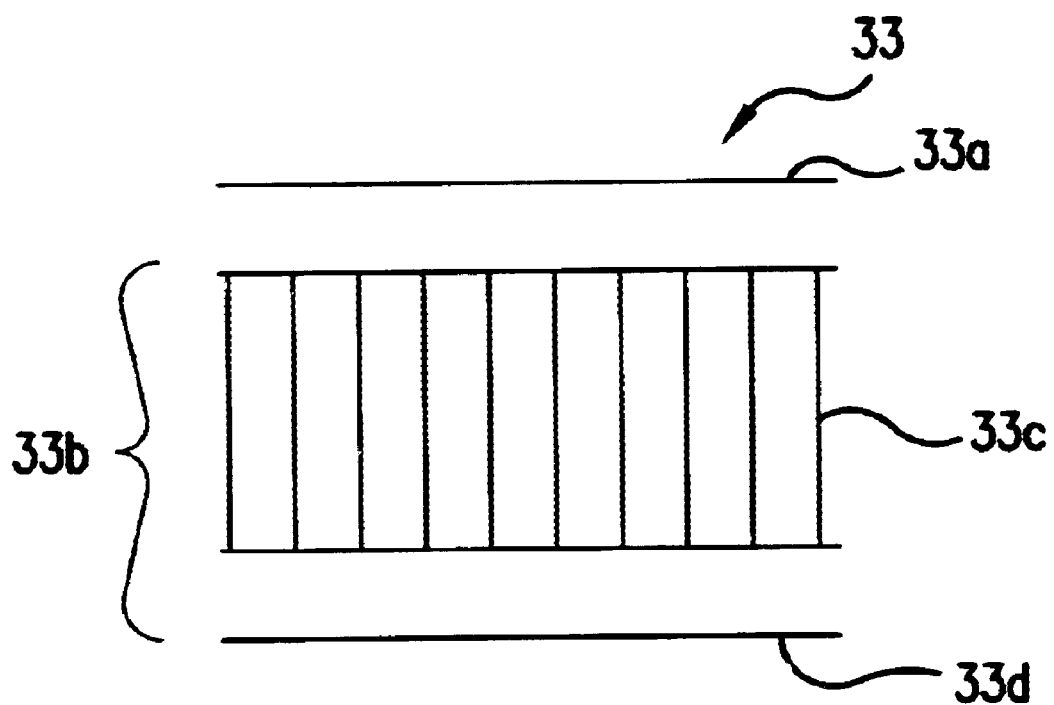
FIG. 2A illustrates additional detail of one alternative embodiment of the protective or light attenuating layer 33 of FIG. 2

The photocathode arrangement 29 includes the photocathode layer 31, which preferably is a 0.00001–0.1 mm thick layer of e.g. CsI or, an organic photo converter or any other efficient gaseous, liquid or solid photo converter, and the protective layer 33, which preferably is a 0.01–1 $\mu$m thick layer of e.g. CsI. Photocathodes are generally sensitive to small impurities in any gas in contact with it, which impurities cause degradation of the quantum efficiency of the photocathode with time. Thus, the protective or light attenuating layer 33 shall protect the cathode layer 31 from direct contact with the amplification medium, i.e. the avalanche gas, of the avalanche amplification detector 36, but shall be transparent to the electrons released from the photocathode layer surface. Further, the protective layer shall advantageously be opaque to light since there may occur fluorescence in electron avalanche amplification detector 35 and this fluorescence light has to be prevented from reaching the photocathode layer and thus from striking out more electrons, which would affect the detection in an unwanted manner. If the protective layer 33a is not opaque to light it may be covered by a thin metallic layer, 33d which is opaque to light and transparent to electrons as illustrated in FIG. 2A.

The electron avalanche amplification detector 35 comprises sidewalls 49, which together with photocathode arrangement 29 and the array 36 of readout elements constitute an airtight housing. The interior of this housing constitutes an optional drift and amplification volume 51 and is filled with a substance suitable for electron avalanche amplification, such as a gas, which can be for example $CO_2$ or a mixture of for example helium and isobutane, or any other gas suitable for electron avalanche multiplication. The gas is preferably at atmospheric pressure, but can be both at under—as well as overpressure.

Alternatively, the detector itself is not encasing the avalanche amplification substance, but is placed within an external containment.

Further, electron avalanche amplification detector 35 comprises an avalanche cathode arrangement 53 and an avalanche anode arrangement, which, in the present embodiment, is identical with the array 36 of readout elements 37. Avalanche cathode 53 is preferably of an electrically conducting material and avalanche anode arrangement 36 includes typically an insulating substrate 54 wherein the readout elements 37, being of an electrically conducting material, are arranged.

Alternatively, the avalanche anode can be formed separated from the read-out arrangement 36 (not shown in FIG. 2).

The electric potentials, at which the photocathode 29, the avalanche cathode 53, and the avalanche anode 36 arrangements are held, are selected such that a weaker electric field, a drift field, is created between photocathode 29 and avalanche cathode 53 causing drift of photoelectrons released from the photocathode arrangement 29 towards avalanche cathode 53, and a stronger electric field, an avalanche amplification field, is created between avalanche cathode 53 and avalanche anode 36, causing avalanche multiplication of the photoelectrons as they are accelerated towards avalanche anode, or array of readout elements, 36. Electrical field lines between a single one of the readout elements 37 and the photocathode arrangement 29 are schematically indicated in FIG. 2 by reference numeral 55 for illustrative purposes.

A dielectric 57 may be arranged between avalanche cathode 53 and avalanche anode 36. This could be a gas or a solid substrate carrying cathode 53 and anode 36, as shown in FIG. 2. Thus, the applied voltages produce a strong electric field in an array of avalanche amplification regions 59. The avalanche regions 59 are formed in a region between and around the edges of the avalanche cathode 53 which are facing each other, and between the avalanche cathode 53 and the avalanche anode 36.

The avalanche regions 59 are formed by openings or channels in cathode 53 and in the dielectric substrate 57, if present. The openings or channels can be of arbitrary shape, e.g. having a circular or a square cross section. The openings or channels may be arranged in rows, each row of openings or channels including a plurality of openings or channels. A plurality of longitudinal openings or channels or rows of channels are formed beside each other, parallel with each other or with the incident X-rays. Alternatively, the openings or channels can be arranged in other patterns.

Preferably, the collimator passages 43 of the collimator 41, the scintillator elements 23 of the scintillator 25 and the avalanche regions 59 of the avalanche detector 35 are aligned and overlie each other.

Further, the readout elements 37 are arranged in connection with the openings or channels forming the avalanche regions 59. Preferably at least one element 37 is provided for each opening or channel. The elements 37 are electrically insulated from each other by means of the dielectric substrate 54, and separately connected to the signal processing circuit 39 by means of the individual signal conduits 40.

By providing a two-dimensional array of collimator passages 43, scintillator elements 23, avalanche regions 59 and read-out elements 37 a detector apparatus 21 may be obtained, wherein electron avalanches derivable mainly from ionization by transversely separated portions of the incident radiation beam 27 are separately detectable. Hereby, apparatus 21 provides for two-dimensional imaging. Similarly, by employing one-dimensional arrays of respective elements an apparatus for one-dimensional imaging is obtained.

In operation, the detector apparatus 21 of FIG. 1 is positioned in the path of the radiation desired to be detected. Rays of incident radiation emanating directly from the subject under examination will travel in a path so as to pass through channels 43 in collimator 41 and enter scintillator elements 23, whereas unwanted radiation scattered from the subject under examination towards the detection device will typically travel at some angle to the plane of the collimator and thus will not be able to traverse any of the channels 43.

Interaction between the incident radiation and the scintillator material result in the generation of light photons; due to optically reflective coating 47, light photons will generally be directed toward the photocathode arrangement 29. Light absorbent interstitial barriers 45 result in each scintillator element being isolated from adjoining elements, thus substantially eliminating cross talk between the elements.

Light photons hitting the photocathode arrangement 29 will cause electrons, so called photoelectrons, to be emitted. It is important that the material of the photocathode has a characteristic energy called work function (i.e. the binding energy of the cathode electrons) that is lower than the photon energy of the incident light so that electrons can be released and that the photocathode is thin enough to be capable of emitting electrons from its back surface, i.e. not the surface onto which the light photons are impinging.

Such released electrons are drifted towards the avalanche cathode and are accelerated due to the strong electric field between the avalanche cathode 43 and avalanche anode 45 (schematically indicated by arrow 53)

The accelerated electrons will interact with other material (e.g. atoms, molecules etc.) in regions 59, causing electron-ion pairs to be produced. Those produced electrons will also be accelerated in the field, and will interact repetitively with new materia, causing further electron-ion pairs to be produced. This process continues during the travel of the electrons in the avalanche region towards anode arrangement 36 located at the bottom of the avalanche region, and in such way electron avalanches are formed.

The electron avalanches induce electric pulses in the read-out elements of detector 35, which are individually detected as each readout element has its individual signal conduit 40 to the signal processor 39. The signal processing electronics processes the pulses; it possibly shapes the pulses, and integrates or counts thereafter the pulses from each readout element.

In the embodiment described above particular locations and geometries of collimator, scintillator, cathode, anode, and read-out arrangements are described. There are, however, a plurality of other locations and geometries that are equally well suitable in connection with the present invention.

It is general for the invention that each incident X-ray photon causes one induced pulse in one or more detector electrode elements 37.

It is also general for the invention that the inter-electrode volumes are thin, which results in a fast removal of ions, which leads to low or no accumulation of space charges. This makes operation at high rate possible. The small distances leads also to low operating voltages, which results in low energy in possible sparks, which is favorable for the electronics. The focusing of the field lines in the avalanche means is also favorable for suppressing streamer formations, which leads to a reduced risk for sparks.

As an alternative, at least in some instances, the cathode arrangement 53 may be dispensed with, and an electric field between photocathode arrangement 29 and anode array 36 can be kept high enough to cause electron avalanche amplification within the complete volume as defined by regions 51 and 59.

As a further alternative the light-opaque functionality of the protective layer 33 may be provided by a light attenuator layer 33b (shown in FIG. 2A) between the photocathode 31 and the avalanche amplification detector 35. This light attenuator 33b should prevent any light created within avalanche amplification detector 35, and possibly within itself, from reaching photocathode layer 31, and is comprised e.g. of an array of glass capillary tubes 33c arranged such that the scintillator elements are overlying and aligned with the capillary tubes. A thin metallic layer structure 33d may be arranged at the bottom of the capillary tubes, i.e. adjacent to avalanche amplification detector 35, and possibly also at the top of the capillary tubes, i.e. adjacent to photocathode arrangement 29. Such layers are opaque to light and transparent to electrons. By applying a suitable voltage over the length of the capillary tubes photoelectrons released from photocathode layer 31 can be drifted through the light attenuator without any losses.

As still a further alternative is to use above described light attenuator also as the avalanche amplification detector. Thus the capillary tubes are filled with a suitable avalanche amplification medium and readout elements are arranged at the bottom of the capillary tubes such that the capillary tubes are overlying and aligned with the readout elements.

Further, all electrode surfaces may be covered by a high-resistive or semiconducting material in order to decrease the energy in possible sparks, which will influence the measurement and may destroy electronic equipment of the detector. Such resistive layers are further described in our copending Swedish patent application Ser. No. 9901327-8 entitled Radiation detector and an apparatus for use in radiography and filed on Apr. 14, 1999. The application is hereby incorporated by reference.

Alternatively, for the same reason, the complete or portions of the cathode and anode arrangements may be made of a semiconducting material, e.g. silicon.

The photocathode is in the illustrated case directly coupled to the scintillator. It shall, however, be appreciated that the photocathode may nevertheless be arranged at a distance from the scintillator. In such instance the photocathode is optionally covered by a respective protective layer on each side. It shall also be appreciated that the scintillating substance and the electron avalanche amplification substance may be the same substance. In such instance, the photocathode may be arranged within this combined scintillating and avalanche amplification substance.

The method and apparatus can in some cases even be used to count the photons produced in the scintillator by a single X-ray. Thus allowing a more accurate determination of the X-ray energy.

It will be obvious that the invention may be varied in a plurality of ways. Such variations are not to be regarded as a departure from the scope of the invention. All such modifications as would be obvious to one skilled in the art are intended to be included within the scope of the appended Claims.

What is claimed is:

1. An apparatus for detection of ionizing radiation comprising:
    a scintillator adapted to convert incident ionizing radiation into light;
    a photocathode adapted to release photoelectrons in response to being struck by said light;
    an electron avalanche amplifier including a chamber filled with a gas or a gas mixture suitable for electron avalanche amplification, wherein the amplifier is adapted to avalanche amplify said photoelectrons by means of an interaction with said gas or gas mixture; and
    a readout arrangement adapted to detect said avalanche amplified electrons; and
    a light attenuator arranged between said photocathode and said electron avalanche amplifier, said light attenuator being comprised of a layer arranged on the surface of said photocathode, wherein said layer is transparent to electrons and opaque to light to prevent light created within the electron avalanche amplifier from reaching said photocathode.

2. The apparatus as claimed in claim 1 wherein the electron avalanche amplifier includes an array of avalanche amplification volumes filled with an avalanche amplification medium.

3. The apparatus as claimed in claim 2 wherein the avalanche amplification medium is a gas or a gas mixture.

4. The apparatus as claimed in claim 2 wherein the avalanche amplification medium is a liquid.

5. The apparatus as claimed in claim 2 wherein the avalanche amplification medium is a solid.

6. The apparatus as claimed in claim 2 wherein the individual avalanche amplification volumes are separated from each other by a dielectric.

7. The apparatus as claimed in claim 2 wherein the array of avalanche amplification volumes includes a plurality of dielectric tubes.

8. The apparatus as claimed in claim 1 wherein the electron avalanche amplifier includes an avalanche cathode and an avalanche anode.

9. The apparatus as claimed in claim 8 wherein the avalanche cathode is permeable to electrons.

10. The apparatus as claimed in claim 1 wherein the readout arrangement includes an array of readout elements.

11. The apparatus as claimed in claim 1 wherein the photocathode is adapted to release photoelectrons from a first surface in dependence on said light impinging on a second surface of the photocathode, said first and second surfaces being opposite to each other.

12. The apparatus as claimed in claim 11 wherein the photocathode is a 0.0001–0.1 mm thick layer.

13. The apparatus as claimed in claim 11 wherein said first surface is a back surface and said second surface is a front surface.

14. The apparatus as claimed in claim 1 wherein the photocathode is directly coupled to the scintillator.

15. The apparatus as claimed in claim 1 wherein the photocathode is arranged at a distance from the scintillator.

16. The apparatus as claimed in claim 15 wherein the photocathode is covered by a respective protective layer on each side.

17. The apparatus as claimed in claim 1 wherein the scintillator includes an array of scintillator elements.

18. The apparatus as claimed in claim 1 wherein the scintillator comprises a liquid scintillating substance.

19. The apparatus as claimed in claim 18 wherein said liquid scintillating substance is liquid xenon or argon.

20. The apparatus as claimed in claim 1 further comprising a collimator adapted to collimate said incident ionizing radiation.

21. The apparatus as claimed in claim 1 comprising an array of glass capillary tubes arranged between said photocathode and said electron avalanche amplifier, said array of glass capillary tubes being provided with a thin metallic layer structure opaque to light and transparent to electrons arranged at the bottom of the capillary tubes, and wherein said array of capillary tubes is oriented so that said thin metallic layer structure is located adjacent said electron avalanche amplifier to prevent light created within the electron avalanche amplifier from reaching said photocathode.

22. The apparatus as claimed in claim 21, comprising a thin metallic layer structure opaque to light and transparent to electrons, said thin metallic layer structure being arranged at the top of the capillary tubes.

23. The apparatus as claimed in claim 22, comprising a voltage supply for applying a suitable voltage over the length of the capillary tubes so that photoelectrons released from said photocathode will be drifted through the light attenuator without any losses.

24. A method for detection of ionizing radiation comprising the steps of:
    converting incident ionizing radiation into light by means of a scintillator;
    releasing photoelectrons in dependence on said light by means of a photocathode;
    avalanche amplifying said photoelectrons in a gaseous-based electron avalanche amplifier; and
    detecting said avalanche amplified electrons by means of a readout arrangement, wherein any light created in the electron avalanche amplifier is prevented from reaching the photocathode by means of a layer arranged on the surface of said photocathode facing said electron avalanche amplifier, said layer being transparent to electrons and opaque to light.

25. The method as claimed in claim 24 wherein said photoelectrons are amplified in an array of amplification volumes filled with an avalanche amplification medium.

26. The method as claimed in claim 24 wherein said photoelectrons are amplified in a gas or a gas mixture.

27. The method as claimed in claim 24 wherein said photoelectrons are amplified in a liquid.

28. The method as claimed in claim 24 wherein said photoelectrons are amplified in a solid.

29. The method as claimed in claim 24 wherein said photoelectrons are amplified by means of applying a voltage an avalanche cathode and an avalanche anode.

30. The method as claimed in claim 29 wherein said photoelectrons are passed through the avalanche cathode.

31. The method as claimed in claim 24 wherein said avalanche amplified electrons is detected by means of an array of readout elements.

32. The method as claimed in claim 24 wherein said photoelectrons are released from a first surfaceof the photocathode in dependence on said light impinging on a second surface of the photocathode, said first and second surfaces being opposite to each other.

33. The method as claimed in claim 24 wherein the incident ionizing radiation is converted into light in an array of scintillator elements.

34. The method as claimed in claim 24, wherein said layer is a thin metallic layer.

35. The method as claimed in claim 24, wherein said any light created in the electron avalanche amplifier is prevented from reaching the photocathode by means of an array of glass capillary tubes arranged between said photocathode and said electron avalanche amplifier, the array of glass capillary tubes being provided with a thin metallic layer structure opaque to light and transparent to electrons at the bottom of the capillary tubes, and being oriented such that said thin metallic layer structure is located adjacent said electron avalanche amplifier.

36. The method as claimed in claim 35, wherein a thin metallic layer structure opaque to light and transparent to electrons is arranged at the top of the capillary tubes.

37. The method as claimed in claim 36, wherein a suitable voltage is applied over the length of the capillary tubes such that photoelectrons released from said photocathode (31) are drifted through the light attenuator without any losses.

* * * * *